United States Patent
Graeber

(10) Patent No.: US 9,183,489 B2
(45) Date of Patent: Nov. 10, 2015

(54) DEVICE FOR AND METHOD OF PROVIDING OPERATING DATA AND/OR DATA ASSOCIATED WITH PLAYBACK DATA TO A REMOTE DEVICE

(75) Inventor: Frank Graeber, Seester (DE)

(73) Assignee: NXP B.V., Eindhoven (NL)

( * ) Notice: Subject to any disclaimer, the term of this patent is extended or adjusted under 35 U.S.C. 154(b) by 2426 days.

(21) Appl. No.: 11/814,366

(22) PCT Filed: Jan. 12, 2006

(86) PCT No.: PCT/IB2006/050112
§ 371 (c)(1),
(2), (4) Date: Jul. 31, 2007

(87) PCT Pub. No.: WO2006/077505
PCT Pub. Date: Jul. 27, 2006

(65) Prior Publication Data
US 2008/0187292 A1    Aug. 7, 2008

(30) Foreign Application Priority Data
Jan. 19, 2005   (EP) .................................... 05100309

(51) Int. Cl.
*H04N 9/80* (2006.01)
*H04N 5/765* (2006.01)
*G06K 19/077* (2006.01)

(52) U.S. Cl.
CPC .... *G06K 19/07758* (2013.01); *G06K 19/07749* (2013.01)

(58) Field of Classification Search
USPC .................................. 386/200–234, 239–248
See application file for complete search history.

(56) References Cited

U.S. PATENT DOCUMENTS

| | | | |
|---|---|---|---|
| 5,875,450 A | 2/1999 | Reiner et al. | |
| 6,694,106 B2* | 2/2004 | Yoshimura | 399/12 |
| 6,701,526 B1* | 3/2004 | Trovato | 725/39 |
| 7,213,766 B2* | 5/2007 | Ryan et al. | 235/492 |
| 2002/0089610 A1* | 7/2002 | Ohno et al. | 348/734 |
| 2002/0116268 A1 | 8/2002 | Fukuda | |
| 2002/0191471 A1* | 12/2002 | Caulkins | 365/226 |
| 2003/0042316 A1 | 3/2003 | Teraura | |
| 2003/0078986 A1* | 4/2003 | Ayres et al. | 709/217 |
| 2003/0120745 A1 | 6/2003 | Katagishi et al. | |

(Continued)

FOREIGN PATENT DOCUMENTS

| | | |
|---|---|---|
| CN | 1155912 C | 6/2004 |
| CN | 1183481 C | 1/2005 |
| DE | 4431438 A1 | 3/1994 |
| DE | 4431438 C2 | 3/1994 |
| DE | 19713686 A1 | 3/1997 |

(Continued)

*Primary Examiner* — Hung Dang

(57) ABSTRACT

The invention is related to a device (DEV) for applying operating data (OPDAT) of said device (DEV) and/or data associated (ASDAT) with playback data (PLDAT) played by said device (DEV) to a remote device (RD). The device (DEV) comprises a memory (MEM) and a power supply (POW, BAT) arranged to power said device (DEV) and said memory (MEM). Operating data (OPDAT) and/or said associated data (ASDAT) are stored in said memory (MEM) during operation of said device (DEV). Subsequently said data (OPDAT, ASDAT) can be read by means of said remote device (RD) being in the proximity of device (DEV). According to the invention said memory (MEM) is designed to be powered by means of radio waves emitted by the remote device (RD). Hence data (OPDAT, ASDAT) can even be read if the power supply (POW, BAT) is not available, because it is switched off or broken for example.

20 Claims, 2 Drawing Sheets

(56) References Cited

U.S. PATENT DOCUMENTS

| | | |
|---|---|---|
| 2003/0139199 A1 | 7/2003 | Kinnula et al. |
| 2003/0235250 A1* | 12/2003 | Varma et al. ............. 375/240.29 |
| 2004/0003631 A1* | 1/2004 | Park et al. .................... 68/12.01 |
| 2004/0033059 A1* | 2/2004 | Kim et al. ..................... 386/113 |
| 2004/0087273 A1 | 5/2004 | Perttila et al. |
| 2004/0186879 A1* | 9/2004 | Ha et al. ........................ 709/200 |
| 2004/0236899 A1 | 11/2004 | Teicher |
| 2005/0154500 A1* | 7/2005 | Sonnenrein et al. .............. 701/1 |
| 2006/0261927 A1 | 11/2006 | Kelly et al. |
| 2008/0267591 A1* | 10/2008 | Wachtfogel et al. .......... 386/124 |

FOREIGN PATENT DOCUMENTS

| | | | |
|---|---|---|---|
| DE | 19923509 A1 | 5/1999 | |
| DE | 10056112 A1 | 5/2002 | |
| FR | 2850832 A | 8/2004 | |
| JP | 2002-242497 A | 8/2002 | |
| JP | 2002-288963 A | 10/2002 | |
| JP | 2003150922 | 5/2003 | |
| JP | 2004-356861 A | 12/2004 | |
| WO | WO0021032 A | 4/2000 | |
| WO | WO 03/105434 A1 * | 12/2003 | ............. H04L 29/06 |

* cited by examiner

DEVICE FOR AND METHOD OF PROVIDING OPERATING DATA AND/OR DATA ASSOCIATED WITH PLAYBACK DATA TO A REMOTE DEVICE

FIELD OF THE INVENTION

Present invention is related to a method of applying operating data of a device and/or data associated with playback data played by said device to a remote device, wherein said operating data and/or said associated data are stored in a memory of said device during operation of said device, wherein said device and said memory are powered by means of a power supply.

Furthermore the invention is related to a device for applying operating data of said device and/or data associated with playback data played by said device to a remote device comprising a memory, a power supply arranged to power said device and said memory, and means for storing said operating data and/or said associated data in said memory during operation of said device.

BACKGROUND OF THE INVENTION

Nowadays consumers are confronted with an ever-increasing amount of data, which is presented to them. Nearly every device comprises at least a small display to output data so as to instruct or inform a user. Examples are any kind of domestic appliances such as a washing machine, a dishwasher, an oven, a mixer, a coffee machine, etc. Besides this there are a lot of devices whose destination is simply playing back data. Examples are consumer electronics such as a TV set, a radio, a CD player, a DVD player/recorder, a video tape recorder, a hard disk recorder, a set top box, etc.

In addition to data which are shown to a user there are a lot of "hidden" data, which are stored for later use and which are used under certain circumstances only. Nearly every device in this context comprises a memory for storing operating data such as error messages for instance. To support a technician, who repairs faulty devices, this memory can be read out so that the technician can see the history of the machine. Yet another example for such data are data associated with playback data played by a device. Such associated data are often referred as "meta data" or as "(file) properties". Thanks to an ever increasing bandwidth said associated data may be transmitted in addition to pure playback data (e.g. video and audio) via broadcast channels or may be stored on data carriers respectively. Hence the video and audio data of a TV program, which program needs a backward channel (e.g. for shopping or voting), may additionally be provided with associated data such as a backward address (e.g. a telephone number or an internet address). It should be noted that data in dialable format are meant here, not the data displayed on the screen of a TV-set which are only visible but not dialable. A telephone or a computer connected to the TV-set can extract the associated data, for example a telephone number in ASCI format and automatically connect to the right subscriber.

It should further be noted that in fact "hidden" data may be presented to a user at the moment of generation, meaning that data are output and stored in parallel. One example would be the temperature of a washing machine, which is output to a display of the machine as well as stored in a memory for logging reasons. But it is also imaginable that the associated data mentioned above are output to a small display of the TV set or that their presence is indicated with a small light at least.

It is the nature of the above-mentioned data that they are not always used but only occasionally. It could happen for example that a user wants to order a product a while after he has seen a TV program on a shopping channel. It could even happen that meanwhile he has switched off the TV set. If so, he has to switch on the TV set again to access the memory that stores the wanted telephone number. Coming back to operating data it could happen that a device is seriously damaged to such an extent that it cannot be switched on, maybe because the power supply is broken or an electric circuit causes a short circuit. In such a case it is well-nigh impossible to access the operating data in the memory which might be exactly what is needed to determine whether it is reasonable to repair the device or not. On the grounds that there are methods to circumvent mentioned lacks in principle, there were no intentions to solve these problems or even to recognize the problem. However, taking into consideration what was mentioned above, one can easily understand that prior art devices are very inconvenient in this respect.

OBJECT AND SUMMARY OF THE INVENTION

Hence it is an object of the present invention to overcome aforesaid restrictions and to present a device, which applies operating data and/or data associated with playback to a remote device even when the power supply of said device is switched off or broken.

In order to achieve the object defined above a method as defined in the opening paragraph is presented, additionally comprising the step of contactlessly applying said operating data and/or said associated data to said remote device, which contactlessly powers said memory when said power supply is not available.

In order to achieve the object defined above furthermore a device as defined in the opening paragraph is presented, which additionally comprises means for contactlessly applying said operating data and/or said associated data to said remote device, wherein said memory is arranged to be powered contactlessly by said remote device when said power supply is not available.

In contrast to prior art systems a user can now access data stored in a memory even if the power supply of the device, in which the memory is built, is not available. Hence the invention overcomes the restrictions cited above, which are very common to prior art systems.

One example for such a system is disclosed in DE 44 31 438, "Einrichtung zur Kommunikation eines Fernsehempfängers mit einem Telefonapparat", which discloses a TV set that is capable of receiving a TV program and associated data (e.g. telephone numbers) in ASCI format in parallel. Video and audio data are output to the display and to the loudspeakers in a known manner. Associated data are output to an infrared interface and transmitted to a telephone via an infrared link. Subsequently, the telephone can automatically dial the telephone number received via the TV program. A quite similar system is disclosed in DE 199 23 509.

A second example is disclosed in DE 197 13 686, "Meldeeinrichtung für elektrisch betriebene Haushaltsgeräte", which is about a washing machine informing a user about the remaining washing time or when the washing is finished. This is accomplished by means of transmitting a corresponding message from the washing machine to a cordless phone.

Both examples clearly show that reading data from a memory is only possible when the device is powered. The present invention overcomes this limitation, which leads to various advantages, which will be described in more detail hereinafter.

It is of advantage for the inventive method when said operating data and/or said associated data are contactlessly stored in said memory and said memory is contactlessly powered by said device. Accordingly, it is advantageous when the inventive device comprises means for contactlessly storing said operating data and/or said associated data in said memory, wherein said memory is arranged to be powered contactlessly by said device. In this manner said memory can be decoupled from the device, so that faults in the device have no or only minor impact on the memory. So even if, for example, a device has a broken power supply or there is a short circuit somewhere, there is no influence on reading out data by means of a remote device.

Another preferred embodiment is a method, wherein said playback data and said associated data are received by said device via a broadcast channel and/or read from a data carrier, which is loaded into said device. Accordingly, it is preferred when the inventive device comprises means for receiving said playback data and said associated data via a broadcast channel and/or comprises means for reading the same from a data carrier, which is loaded into said device. There is a need to provide information associated with audio and/or video data, for example the title of a song, the name of a retailer of a certain product, a link to the manufacturer of a product, etc. A CD player or an MP3 player for instance has only a small display, which is normally even not designed to show the full title of a song and least of all designed to display the lyrics of a song. So the corresponding data may be transmitted to a mobile phone or a PDA, which normally have displays of sufficient size to show titles and lyrics. Basis is a data carrier (e.g. a CD as stated) storing playback data as well as associated data. A further example are broadcast channels where the data source is remote. TV sets normally have proper displays to show song lyrics or similar. Here the emphasis is placed on the provision of automatic dial. For the sake of completeness it should be noted that the invention also applies to radios and in particular to car radios. It is quite impossible to note a telephone number while driving a car. So it will be very useful if the telephone number for shopping or voting is stored in a memory of the radio for later use. In this manner the telephone number can be read with a mobile phone for example even when the car's ignition or the radio respectively is switched off.

Yet another preferred embodiment of the invention is a device, comprising an interface in accordance with the standard for Near Field Communication, NFC for short, for contactlessly storing and/or providing said operating data and/or said associated data. The NFC technology evolved from a combination of contactless identification, namely the RFID technology, and interconnection technologies. NFC operates in the 13.56 MHz frequency range, over a distance of typically a few centimeters but newer developments go on, which aim greater distances of up to 1 m. NFC technology is standardized in ISO 18092, ECMA 340 and ETSI TS 102 190. NFC is also compatible with the broadly established contactless smart card infrastructure based on ISO 14443. NFC Interfaces are nowadays widely used in mobile phones and other mobile devices. Hence it is favorable to use these modules for the invention.

Devices comprising an NFC interface, which in principle can be accessed passively (meaning powered by a remote device), are known in prior art. The probably most used device is a mobile phone with such an interface. Typically there are smart card data, such as credit card data, etc. stored in the memory of an NFC interface. But also TV sets comprising an NFC interface are known from prior art. Here the interface is mainly used for uploading photographs from an NFC mobile phone to an NFC TV set so as to display the pictures taken with the camera of the mobile phone. Those devices have never been used before for storing and providing operating data and/or associated data in the inventive sense.

It is also of advantage if said memory is detachable. In this way a memory can be exchanged if it is full, so that new data can be written without destroying older data. Examples for memories of such kind are solid-state memories such as compact flash cards, secure digital/multimedia cards, smart media cards, memory sticks, picture cards, and hard disks such as the so-called "microdrives" as well as USB-sticks and the like. Finally, RFID tags are applicable as well.

It is advantageous when the device is one of a domestic appliance or a consumer electronics device. On the one hand the use of these kinds of devices is widespread, on the other hand, the use of remote devices such as mobile phones and PDAs is widespread as well. So there is only less technical and financial effort to profit from the invention.

Finally, it is advantageous when the device is
one of a washing machine, a dish washer, an oven, a mixer, or a coffee machine in case of storing/providing operating data or
one of a TV set, a radio, a CD player, a DVD player/recorder, a video tape recorder, a hard disk recorder, a set top box, or a personal computer in case of storing/providing operating data and/or associated data. This is another group of devices, which are widespread in use in today's households. The benefit cited above is applicable here as well. It is noted that the examples must not serve as a basis for a limitation of the broad scope of the invention.

BRIEF DESCRIPTION OF THE DRAWINGS

The invention will now be explained in more detail by means of figures, which show advantageous embodiments of the invention. It is noted that the following examples may not serve to narrow the broad scope of the invention either.

DESCRIPTION OF EMBODIMENTS

Figure 1:
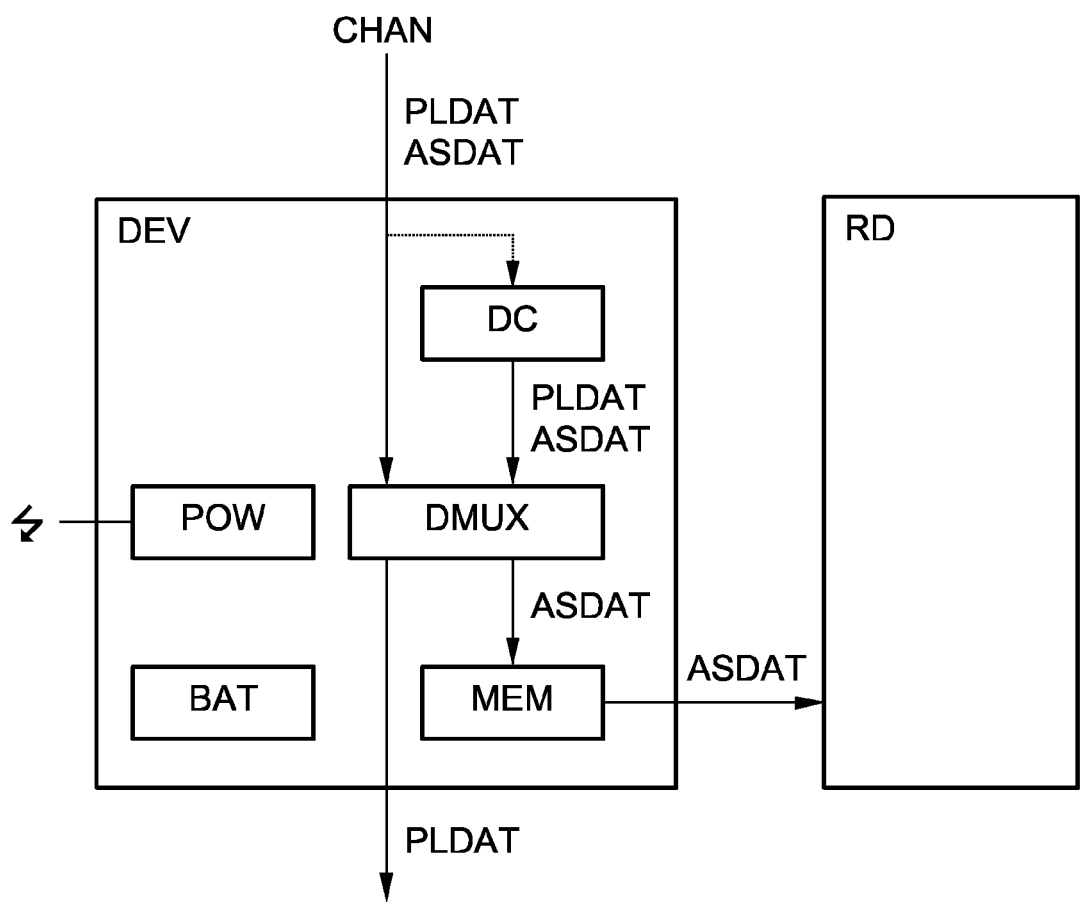
FIG. 1 shows an inventive device designed to render data.

FIG. 1 shows an inventive device DEV designed to render playback data PLDAT. In the proximity of said device DEV there is additionally a remote device RD. The device DEV comprises a memory MEM, a demultiplexer DMUX, a data carrier DC, and a power supply built up of a connection POW to the electricity network and a battery BAT. Finally, device DEV has an input for a broadcast channel CHAN. Presumably device DEV is a commercially available hard disk recorder for storing TV-programs.

It should be noted that this example must not serve to limit the scope of the invention. The principles explained by means of FIG. 1 are also applicable to other devices designed to play back data, e.g. TV-sets, CD-players and so on. In fact the principles are also applicable to devices, which only play back audio data such as radios. It is needless to say that the invention finally also applies to computers, in particular to standard personal computers in the home or office environment, which are capable of playing back data in principle. A lot of PCs commercially available nowadays furthermore comprise means for receiving broadcast data, such as cards for receiving radio, terrestrial TV and satellite TV.

Now reference is made to the function of the arrangement shown in FIG. 1. Device DEV receives playback data PLDAT as well as associated data ASDAT. For the sake of better understanding in the following it is assumed that playback data PLDAT are a TV program (video and audio data) on a typical shopping channel. In addition, associated data ASDAT are broadcast in parallel, which associated data ASDAT can be imagined to be for example telephone numbers, internet links, prices and names associated with the products, currently visible and audible through playback data PLDAT. Normally, the advertised products change quickly because time is expensive on television. Hence one has to be quite quick to write down a telephone number or an URL so as to get further information or to order a product. So it is very advantageous if the associated data ASDAT are stored for later use. Therefore, demultiplexer DMUX, which is designed to split the data coming over the broadcast channel CHAN into playback data PLDAT and associated data ASDAT, forwards associated data ASDAT to the memory MEM where the associated data ASDAT are stored. Playback data PLDAT are immediately rendered and thus output to a user. It should be noted that immediate access to associated data ASDAT is not excluded since memory MEM may be read out immediately as well. In the present case it is presumed that the user ponders about buying a product for a while. Because it has become late he goes to bed. Next morning he decides to buy the product. Therefore, he sways his mobile phone, which acts as a remote device RD in this example, over a predefined location on the device DEV (hard disk recorder).

Normally, even when associated data ASDAT are stored by the device DEV for later use, a user has to switch on the device to access the in-built memory MEM. Because more and more devices need some time to boot as they have microprocessors. This is very inconvenient even when it takes only a few seconds. Consumers are not fully accustomed to this behavior of consumer electronics as devices worked immediately when they were switched on in earlier times. Even if there is no boot time, people normally do not want to be burdened by their devices.

In contrast to the prior-art system mentioned above, according to the present invention there is no need to switch on an inventive device DEV for reading the memory MEM. The remote device RD, here a mobile phone with an in-built interface in accordance with the standard for Near Field Communication, NFC for short, powers the memory MEM by means of radio waves. Energy is transmitted from the battery of the remote device RD (battery not shown) to the memory MEM and if necessary to other circuits, which are needed to access the memory MEM, over a small air gap. Thus associated data ASDAT stored in said memory MEM can advantageously be read out without powering the device DEV itself. In the present case it is assumed that associated data ASDAT related to more products are stored in memory MEM, so that a list of products is transmitted to the remote device RD. This list may also have some structure. So it is imaginable that the list is sorted in accordance with the TV channels from where the information was received.

The user has now to select which product he actually wants to buy. Therefore, the list is displayed on his remote device RD. By pressing predefined keys he can scroll the list. After having found the right entry he confirms his wish by pressing another predefined (confirmation) key. Subsequently, the telephone number associated with the desired product is dialed so as to connect the user with a call center of a shop. If there is an internet link instead of a telephone number, a connection to the given internet address is made.

There is no need to see the TV program live. Since our device DEV is assumed to be a hard disk recorder the TV program may be stored on the data carrier DC, here a hard disk, for later use (see dashed line). When the record is played, again playback data PLDAT as well as associated data ASDAT are fed into the demultiplexer DMUX that again splits the data stream. Playback data PLDAT are output, whereas associated data ASDAT are stored in memory MEM. Accessing the memory MEM may happen as stated above.

It should be noted that there is no need to switch off the device DEV before the memory MEM is accessed with a remote device RD. In case the device DEV is switched on, data stored in memory MEM can be read out by a remote device RD. In this case memory MEM does not necessarily have to be powered via radio waves.

Figure 2:
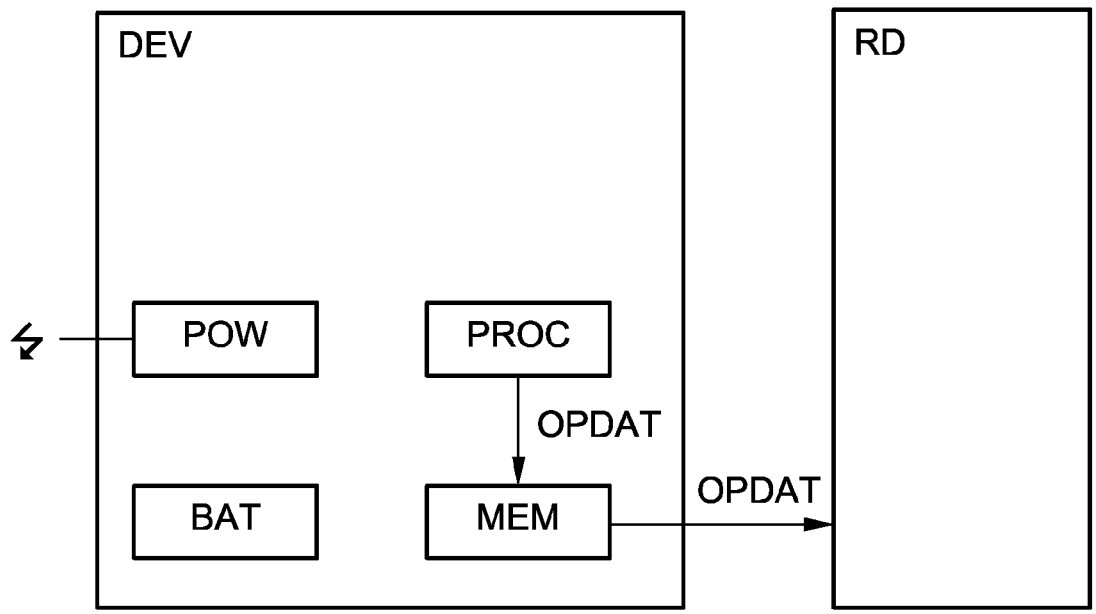
FIG. 2 shows an inventive device designed to store operating data.

Reference is now made to FIG. 2, which shows an inventive device DEV designed to store operating data OPDAT. In the proximity of the device DEV there is additionally a remote device RD. The device DEV again comprises a memory MEM, a power supply built up of a connection POW to the electricity network and a battery BAT. In addition, device DEV comprises a processor PROC. Presumably device DEV is an inventive washing machine.

Operating data OPDAT such as washing temperature and washing program as well as the overall hours of operation are cyclically stored in memory MEM by the processor PROC, which also controls the washing process. It is further imaginable that more sophisticated information is stored in memory MEM such as error codes, which are to be interpreted by a technician, as well as instructions or hints for the user in the sense of an electronic operating manual.

The function of device DEV is quite similar to the one shown in FIG. 1. The only essential difference is the fact that operating data OPDAT instead of associated data ASDAT are stored in memory MEM. Again a user can access the memory MEM with a remote device DEV, which is assumed to be a palmtop with a radio interface. Operating data OPDAT can be read from memory MEM even when device DEV is switched off. Since washing machines normally have much fewer operating hours than hard disk recorders or TV-sets respectively, the advantage shows in a very eye-catching way here. In contrast, a user of prior art systems will have to power the washing machine each time he wants to get some information.

As stated before, said information can contain typical operating data as well as an electronic operating manual. So if a user is unsure how to wash his clothes he may get some information on that when he sways his palmtop (remote device RD) over the washing machine (device DEV). These data may also contain internet links and telephone numbers where additional information can be obtained if that information stored in memory is not sufficient.

Yet another example being logged error messages, which are to help a technician to repair a broken device DEV. It is assumed that the technician uses a laptop with an NFC interface as the remote device RD. He can even access the memory MEM if there is no power supply available because it is damaged or there is a short circuit in the device DEV, so that it is critical to switch on the power. In prior art systems it is quite difficult to access a log file in an in-built memory in this case. Using the inventive device DEV this is no problem. Memory MEM is powered by the remote device RD as stated above. Hence a technician can decide whether to repair a device either or not immediately, without repairing the power supply first.

A further example is given when device DEV is a car, in particular a vehicle computer. As stated above, operating data OPDAT, such as predefined parameters of the engine, the brake system, the tires, etc., are steadily stored in memory MEM. In case of a car breakdown, operating data OPDAT can then be read out, even when there is a short circuit or a flat car battery. In this manner a driver may read out relevant information by means of his mobile phone with NFC interface (remote device RD) and send the information to a breakdown service. Hence a technician of the breakdown service is well prepared in advance to repair the car. It is needless to say that also the technician may read out the memory MEM with his laptop equipped with an NFC interface when he arrives.

Figure 3:
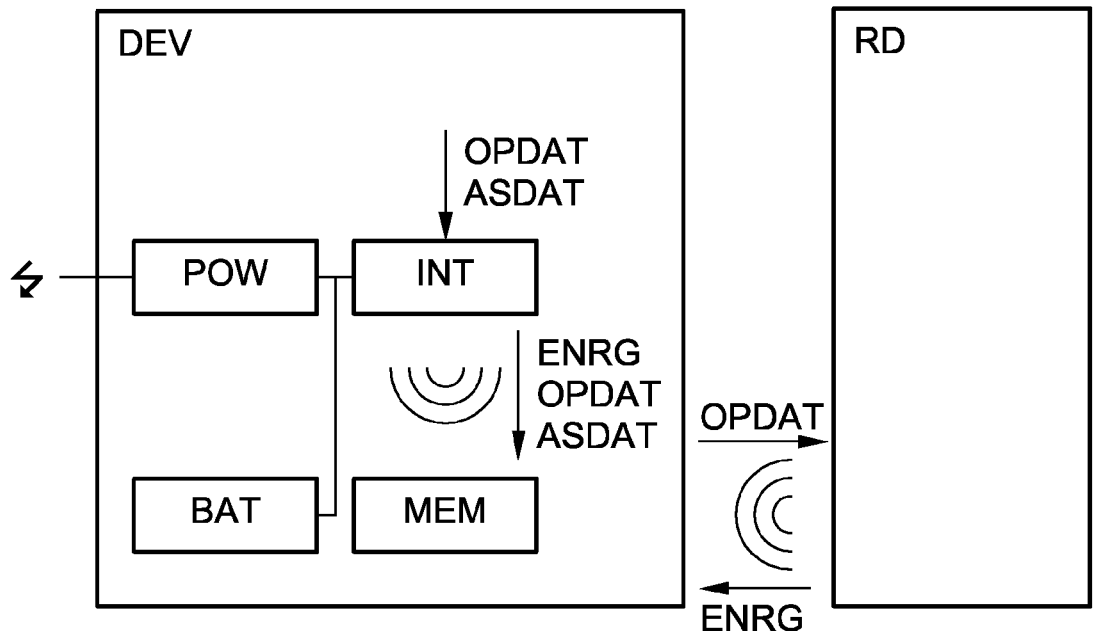
FIG. 3 shows a device, which contactlessly accesses an in-built memory.

FIG. 3 shows a device DEV, which contactlessly accesses the in-built memory MEM. The device DEV again comprises a power supply built up of a connection POW to the electricity network and a battery BAT. In addition, device DEV comprises an interface INT for contactless access to the memory MEM. Again a remote device RD is situated in the proximity of the device DEV.

The arrangement shown in FIG. 3 refers to both types of devices DEV shown in FIGS. 1 and 2. Therefore, operating data OPDAT as well as associated data ASDAT are fed to the interface INT. Subsequently, operating data OPDAT and associated data ASDAT are transmitted to memory MEM by means of radio. Interface INT may be an NFC interface for example or an RFID reader (Radio Frequency Identification) respectively. Accordingly, memory MEM may be a standard RFID tag. In this way not only data are transmitted but also energy ENRG for powering memory MEM. Access via a remote device RD may take place as indicated above. Then energy ENRG is transmitted from remote device RD to the memory MEM. The advantage of this arrangement is the decoupling of memory MEM, which makes memory MEM more or less independent of device DEV. Therefore, faults of device DEV have only minor influence on memory MEM. A short circuit in device DEV for example does not hinder reading out memory MEM with the remote device DEV. Neither does a broken power supply POW, BAT.

It is noted that the function according to FIG. 1 does not exclude the function of FIG. 2 meaning that said hard disk recorder may also store operating data OPDAT in memory MEM. It is also worth mentioning that the power supply need not necessarily contain both a connection POW to an electricity network and a battery BAT. It is also imaginable for device DEV to comprise a battery BAT or a connection POW only. The same applies to the remote device RD.

Besides the applications mentioned above, there are some more in the following. First an audio CD, which serves as a (detachable) data carrier DC for a device DEV, for example a portable CD player. Associated with each music track there is some background information, e.g. the lyrics of the song. A further example would be a ring tone for the mobile phone. Lyrics or ring tones may be directly stored in memory MEM or may be accessible via an internet link stored in memory MEM. In a preferred embodiment downloading is secured by means of a password, which is stored on the CD. In yet another advantageous embodiment a server storing lyrics or ring tones counts how often data have been downloaded so as to fend off abusive use. The same applies for MP3 data stored on the CD.

In a second example vouchers are stored on a DVD so that a person can buy another DVD at a reduced price when the person presents the voucher in a shop. Therefore, the person sways his mobile phone over the DVD player so as to load it from the memory MEM of the DVD player (device DEV) to the mobile phone (remote device RD). Later in a shop he can present the voucher and receives his bonus.

It is easy to understand that not all possible devices and applications which are under the broad scope of the invention can be mentioned here. Therefore, the above examples must not serve to limit the scope of the invention but should rather illustrate how the invention can be applied to our daily life. Whereas reference has been made mainly to the home or office environment, it is obvious for those skilled in the art that the invention also applies to the industrial field meaning also to heavy equipment. Examples are machinery in the wood-working or steel-working industry as well as all kind of vehicles, in particular also those for public transport, even up to appliances in power generation.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware or software. The mere fact that certain measures are recited in mutually different dependent claims does not indicate that a combination of these measures cannot be used to advantage.

The invention claimed is:

1. A method of applying operating data of a first device to a remote device, the method comprising:
   storing said operating data in a memory of said first device during operation of said first device, wherein said first device and said memory are powered by means of a power supply;
   contactlessly applying said operating data to said remote device by accessing the memory with the remote device when said power supply is not available for the first device and the first device is deactivated.

2. The method as claimed in claim 1, further comprising:
   storing said operating data contactlessly in said memory; and
   powering said memory contactlessly by said first device.

3. The method of claim 2, further comprising:
   reading the stored operating data from the memory while the first device is deactivated.

4. The method as claimed in claim 1, further comprising:
   receiving playback data by said first device via a broadcast channel.

5. A device for applying operating data of said device to a remote device, the device comprising:
   a memory;
   a power supply adapted to power said device and said memory;
   means for storing said operating data in said memory during operation of said device; and
   means for contactlessly applying said operating data to said remote device, wherein said memory is accessed contactlessly by said remote device when said power supply is not available and the device is deactivated.

6. The device as claimed in claim 5, further comprising:
   means for contactlessly storing said operating data in said memory, wherein said memory is powered contactlessly by said device.

7. The device of claim 6, wherein stored operating data are read from the memory while the device is deactivated.

8. The device as claimed in claim 5, wherein said means for contactlessly storing said operating data are adapted for the standard for Near Field Communication (NFC).

9. The device as claimed in claim 5, further comprising:
means for receiving playback data and associated operating data via a broadcast channel.

10. The device as claimed in claim 5, wherein said memory is detachable.

11. The device as claimed in claim 5, wherein the device is a domestic appliance.

12. The device as claimed in claim 5, wherein the device is one of a washing machine, a dish washer, an oven, a mixer, a TV set, a radio, a CD player, a DVD player/recorder, a video tape recorder, a hard disk recorder, a set top box, and a personal computer.

13. The device of claim 5, further comprising:
a demultiplexer that splits data from a broadcast channel into playback data and associated operating data.

14. The device of claim 5, wherein the remote device is a mobile phone.

15. The device of claim 5, wherein the remote is a palmtop.

16. The device of claim 5, wherein the operating data are cyclically stored in the memory.

17. The device of claim 5, wherein the device is a vehicle computer.

18. The device as claimed in claim 5, wherein the stored operating data comprise a washing program of a washing machine.

19. The device as claimed in claim 5, wherein the stored operating data comprise operating parameters of a vehicle.

20. The device as claimed in claim 5, wherein the stored operating data are readable when the device is broken.

\* \* \* \* \*